US010870056B2

(12) United States Patent
Taylor et al.

(10) Patent No.: US 10,870,056 B2
(45) Date of Patent: Dec. 22, 2020

(54) EMOJI-BASED COMMUNICATIONS DERIVED FROM FACIAL FEATURES DURING GAME PLAY

(71) Applicant: Sony Interactive Entertainment Inc., Tokyo (JP)

(72) Inventors: Michael Taylor, San Mateo, CA (US); Glenn Black, San Mateo, CA (US)

(73) Assignee: Sony Interactive Entertainment Inc., Tokyo (JP)

( * ) Notice: Subject to any disclaimer, the term of this patent is extended or adjusted under 35 U.S.C. 154(b) by 0 days.

(21) Appl. No.: 15/801,203

(22) Filed: Nov. 1, 2017

(65) Prior Publication Data

US 2019/0126152 A1 May 2, 2019

(51) Int. Cl.
| | | |
|---|---|---|
| *A63F 13/655* | (2014.01) | |
| *G06K 9/00* | (2006.01) | |
| *A63F 13/87* | (2014.01) | |
| *H04L 12/58* | (2006.01) | |
| *A63F 13/213* | (2014.01) | |

(52) U.S. Cl.
CPC .......... *A63F 13/655* (2014.09); *A63F 13/213* (2014.09); *A63F 13/87* (2014.09); *G06K 9/00281* (2013.01); *G06K 9/00302* (2013.01); *H04L 51/10* (2013.01)

(58) Field of Classification Search
CPC .............................. A63F 13/87; A63F 13/655
See application file for complete search history.

(56) References Cited

U.S. PATENT DOCUMENTS

| | | | | |
|---|---|---|---|---|
| 6,835,137 B1* | 12/2004 | Nakamura | ............... | A63F 13/10 463/42 |
| 9,789,403 B1* | 10/2017 | Furment | ................ | A63F 13/428 |
| 9,799,096 B1* | 10/2017 | De la Torre | .......... | G06T 3/0093 |
| 2004/0152512 A1* | 8/2004 | Collodi | .................. | A63F 13/335 463/30 |
| 2004/0175039 A1* | 9/2004 | Miller | ................... | G06K 9/6255 382/181 |
| 2006/0067573 A1* | 3/2006 | Parr | .................... | G06K 9/00201 382/154 |
| 2007/0260984 A1* | 11/2007 | Marks | ..................... | A63F 13/79 715/706 |
| 2008/0037836 A1* | 2/2008 | Chen | .................. | G06K 9/00281 382/118 |
| 2008/0274798 A1* | 11/2008 | Walker | .................... | G07F 17/32 463/25 |
| 2011/0052081 A1* | 3/2011 | Onoe | ...................... | G06T 11/00 382/203 |

(Continued)

FOREIGN PATENT DOCUMENTS

WO   WO-2016080005 A1 *  5/2016  ........... A63F 13/843

*Primary Examiner* — Tramar Y Harper
(74) *Attorney, Agent, or Firm* — Polsinelli LLP

(57) ABSTRACT

Techniques for emoji-based communications derived from facial features during game play provide a communication channel accessible by players associated with gameplay hosted by the online game platform and capture an image of a user using a controller that includes a camera. The techniques further determine facial features of the user based on the image, generate an emoji based on the facial features of the user, and transmit the emoji to the players associated with the online game platform over the communication channel.

20 Claims, 7 Drawing Sheets

(56) References Cited

U.S. PATENT DOCUMENTS

| | | | |
|---|---|---|---|
| 2011/0148864 A1* | 6/2011 | Lee | G06K 9/00221 |
| | | | 345/419 |
| 2011/0296324 A1* | 12/2011 | Goossens | G06F 3/04883 |
| | | | 715/763 |
| 2013/0185354 A1* | 7/2013 | Seligstein | A63F 13/655 |
| | | | 709/204 |
| 2014/0135121 A1* | 5/2014 | Sateesh | A63F 13/63 |
| | | | 463/31 |
| 2014/0154659 A1* | 6/2014 | Otwell | G09B 5/02 |
| | | | 434/365 |
| 2014/0156762 A1* | 6/2014 | Yuen | H04L 51/32 |
| | | | 709/206 |
| 2014/0267544 A1* | 9/2014 | Li | H04M 1/72544 |
| | | | 348/14.02 |
| 2014/0364241 A1* | 12/2014 | Oku | G06K 9/00248 |
| | | | 463/43 |
| 2016/0144278 A1* | 5/2016 | el Kaliouby | A61B 5/165 |
| | | | 463/36 |
| 2016/0170996 A1* | 6/2016 | Frank | G06F 17/30702 |
| | | | 707/748 |
| 2016/0360970 A1* | 12/2016 | Tzvieli | A61B 5/015 |
| 2017/0083086 A1* | 3/2017 | Mazur | G06F 3/012 |
| 2017/0098122 A1* | 4/2017 | el Kaliouby | A61B 5/744 |
| 2017/0171614 A1* | 6/2017 | el Kaliouby | H04N 21/44218 |
| 2017/0235793 A1* | 8/2017 | Hamada | G06F 17/30598 |
| | | | 707/738 |
| 2017/0238860 A1* | 8/2017 | el Kaliouby | A61B 5/0077 |
| 2018/0024991 A1* | 1/2018 | Baldwin | G06F 16/335 |
| | | | 704/9 |
| 2018/0035938 A1* | 2/2018 | el Kaliouby | G06F 19/00 |
| 2018/0121768 A1* | 5/2018 | Lin | G06F 17/30277 |
| 2019/0005313 A1* | 1/2019 | Vemulapalli | G06K 9/00295 |
| 2019/0065835 A1* | 2/2019 | Prokopenya | G06K 9/00281 |

* cited by examiner

EMOJI-BASED COMMUNICATIONS DERIVED FROM FACIAL FEATURES DURING GAME PLAY

BACKGROUND OF THE INVENTION

Field of the Invention

The present disclosure generally relates to streaming content over a network and, more specifically, to improved gameplay communications between users.

Description of the Related Art

Advances in modern technology, network connectivity, processing power, convenience, and the like, support a large community of consumers that access and interactively participate in online game play. Indeed, many consumers access online gameplay over a network (e.g., the Internet) using game consoles/systems which connect to multi-player network platforms. Typical, game consoles/systems include complex and specialized hardware/software that support and enable user interaction as well as provide immersive gameplay experiences. As technology continues to drive more realistic and immersive gameplay experiences, the entertainment and game industry has become inundated with a multitude of equipment options such as controllers, headsets, video-cameras, and the like.

While some advances have been made to improve user interactions related to online gameplay (e.g., improved graphics rendering/modeling, virtual reality (VR) headsets, and the like), other areas of user interaction have stagnated. For example, current gameplay communications or "chats", which support traditional audio and/or text-based communications, fail to appreciate the dynamic and evolving nature of modern inter-personal communications. More specifically, consumers are increasingly using ideograms, smileys, pictographs, emoticons, and other graphic characters/representations in lieu of audible and/or text-based communications. Therefore, there is a need in the art for improved gameplay communications that reflect and support the dynamic and evolving nature of modern inter-personal communications.

SUMMARY OF THE INVENTION

Broadly speaking, the present invention provides improved gameplay communications amongst players associated with an online game platform to reflect and support the dynamic and evolving nature of modern inter-personal communications. For example, the improved gameplay communications particularly support emoji-based communications such as ideograms, smileys, pictographs, emoticons, and other graphic characters/representations.

In one exemplary embodiment, these techniques are described by a method for emoji-based communications derived from facial features during game play. The method includes steps for providing a communication channel accessible by players associated with gameplay hosted by a game platform, capturing an image of a user by a controller that includes a camera, determining facial features of the user based on the image, generating an emoji based on the facial features of the user, and transmitting the emoji to the players associated with the gameplay over the communication channel. With respect to capturing the image, the method further includes steps for capturing the image based on image capture commands (e.g., button presses, audio commands, gesture-based motions, etc.), a scheduled time, and a gameplay status. In addition, the captured image selected from a plurality of images based on changes in the facial features of the user.

In some embodiments, the steps for generating the emoji include adjusting or modifying portions of a model emoji based on the facial features. In other embodiments, the steps for generating the emoji include evaluating the facial features in context of a vector-space, where the dimensions correspond to features and the image is mapped to a query vector based on the extracted features. In this context, the vector-space includes position vectors assigned to an emotion or expression and the method includes steps to determine the expression or the emotion associated with the facial features of the user based on proximity between the query vector and one or more position vectors assigned the expression or the emotion. The method further includes steps to use the expression or emotion as a key to lookup an emoji from a table of emoji indexed according to the same.

In another embodiment, a system employs the above discussed techniques to provide improved gameplay communications. For example, the system includes a network interface to communicate over one or more communication networks, a processor coupled to the network interface and adapted to execute one or more processes, and a memory configured to store a process executable by the processor. The system (e.g., the processor) executes the process and is operable to capture an image of the user by the controller, determine facial features of the user based on the image, generate an emoji based on the facial features of the user, and transmit the emoji to the players associated with the gameplay over the communication channel.

In yet another embodiment, a tangible, non-transitory, computer-readable media includes software with encoded instructions executable by a processor. The processor executes the instructions and is operable to capture an image of the user by the controller, determine facial features of the user based on the image, generate an emoji based on the facial features of the user, and transmit the emoji to the players associated with the gameplay over the communication channel.

DETAILED DESCRIPTION

As used herein, the term "user" refers to a user of an electronic device where actions performed by the user in the context of computer software are considered to be actions to provide an input to the electronic device and cause the electronic device to perform steps or operations embodied by the computer software. As used herein, the term "emoji" refers to ideograms, smileys, pictographs, emoticons, and other graphic characters/representations that are used in place of textual words or phrases. As used herein, the term "player" or "user" are synonymous and, when used in the context of gameplay, refers to persons who participate, spectate, or otherwise in access media content related to the gameplay.

As mentioned above, the entertainment and game industry continues to develop and improve user interactions related to online game play. While many technological advances have improved certain aspects of interactive and immersive experiences, modern gameplay communications continue to use traditional audio and/or text-based communication technology, which fails to appreciate the dynamic and evolving nature of modern inter-personal communications. Accordingly, as described in greater detail herein, this disclosure is directed to improved techniques for gameplay communications that particularly support emoji-based communications (e.g., ideograms, smileys, pictographs, emoticons, and other graphic characters/representations). Moreover, this disclosure describes hardware controllers that include integrated cameras as well as improved gameplay communication techniques, which operate in conjunction with the hardware controllers.

Figure 1:
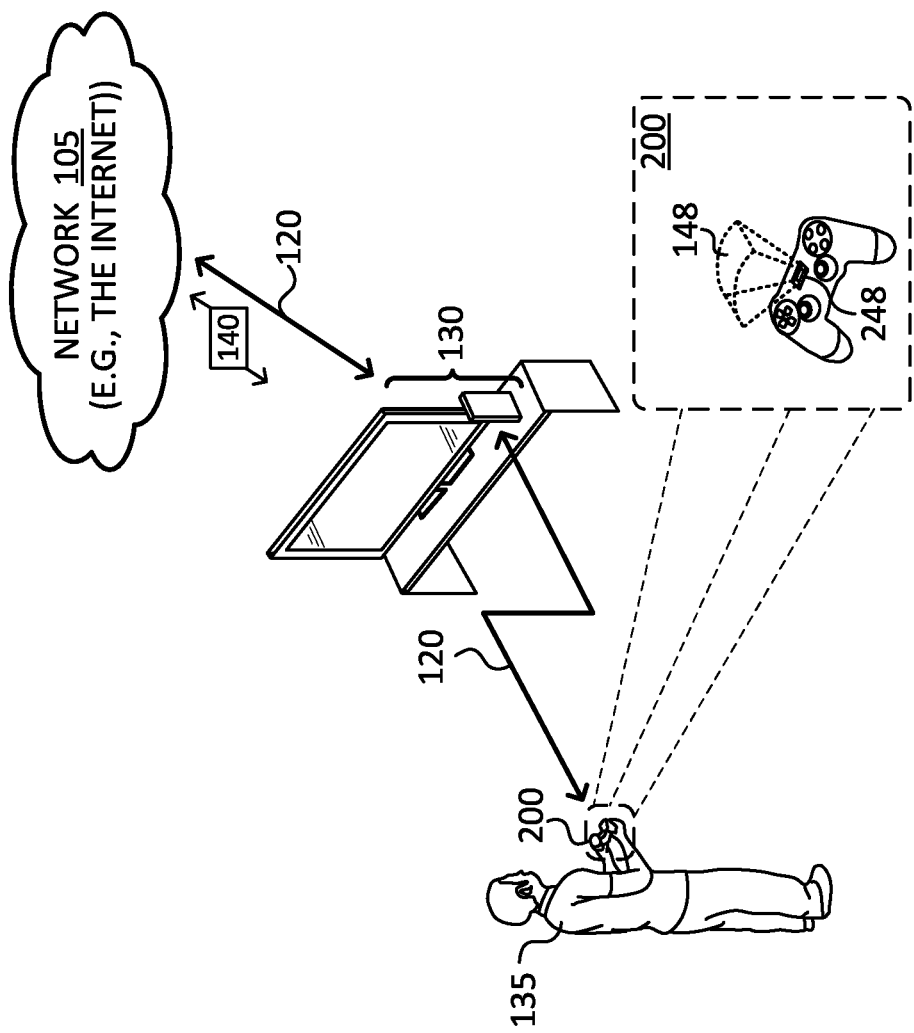
FIG. 1 illustrates a schematic diagram of an example communication environment.

Referring now to the figures, FIG. 1 illustrates a schematic diagram of an example communication environment 100. Communication environment 100 includes a network 105 that represents a distributed collection of devices/nodes interconnected by communication links 120 that exchange data such as data packets 140 as well as transporting data to/from end nodes or client devices such as game system 130. Game system 130 represents a computing device (e.g., personal computing devices, entertainment systems, game systems, laptops, tablets, mobile devices, and the like) that includes hardware and software capable of executing locally or remotely stored programs.

Communication links 120 represent wired links or shared media links (e.g., wireless links, PLC links, etc.) where certain devices (e.g., a controller 200) communicate with other devices (e.g., game system 130) based on distance, signal strength, operational status, location, etc. Those skilled in the art will understand that any number of nodes, devices, links, etc. may be included in network 105, and further the view illustrated by FIG. 1 is provided for purposes of discussion, not limitation.

Data packets 140 represent network traffic/messages which are exchanged over communication links 120 and between network devices using predefined network communication protocols such as certain known wired protocols, wireless protocols (e.g., IEEE Std. 802.15.4, WiFi, Bluetooth®, etc.), PLC protocols, or other shared-media protocols where appropriate. In this context, a protocol is a set of rules defining how the devices or nodes interact with each other.

In general, game system 130 operates in conjunction with one or more controllers 200, which for purposes of discussion, may be considered as a component of game system 130. In operation, game system 130 and controller 200 cooperate to create immersive gameplay experiences for user 135 and provide graphics, sounds, physical feedback, and the like. For example, controller 200 is an interactive device that includes hardware and software to receive user input, communicate user inputs to game system 130, and provide user feedback (e.g., vibration, haptic, etc.). Moreover, controller 200 can accept a variety of user input such as, but not limited to combinations of digital and/or analog buttons, triggers, joysticks, and touch pads, and further detects motion by user 135 using accelerometers, gyroscopes, and the like. As shown, controller 200 also includes an image capture component 248 such as one or more cameras that operatively capture images or frames of user 135 within a field of view 148. Notably, while controller 200 is shown as a hand-held device, it is appreciated the functions attributed to controller 200 are not limited to hand-held devices, but instead such functions are appreciated to readily apply to various types of devices such as wearable devices.

Figure 2:
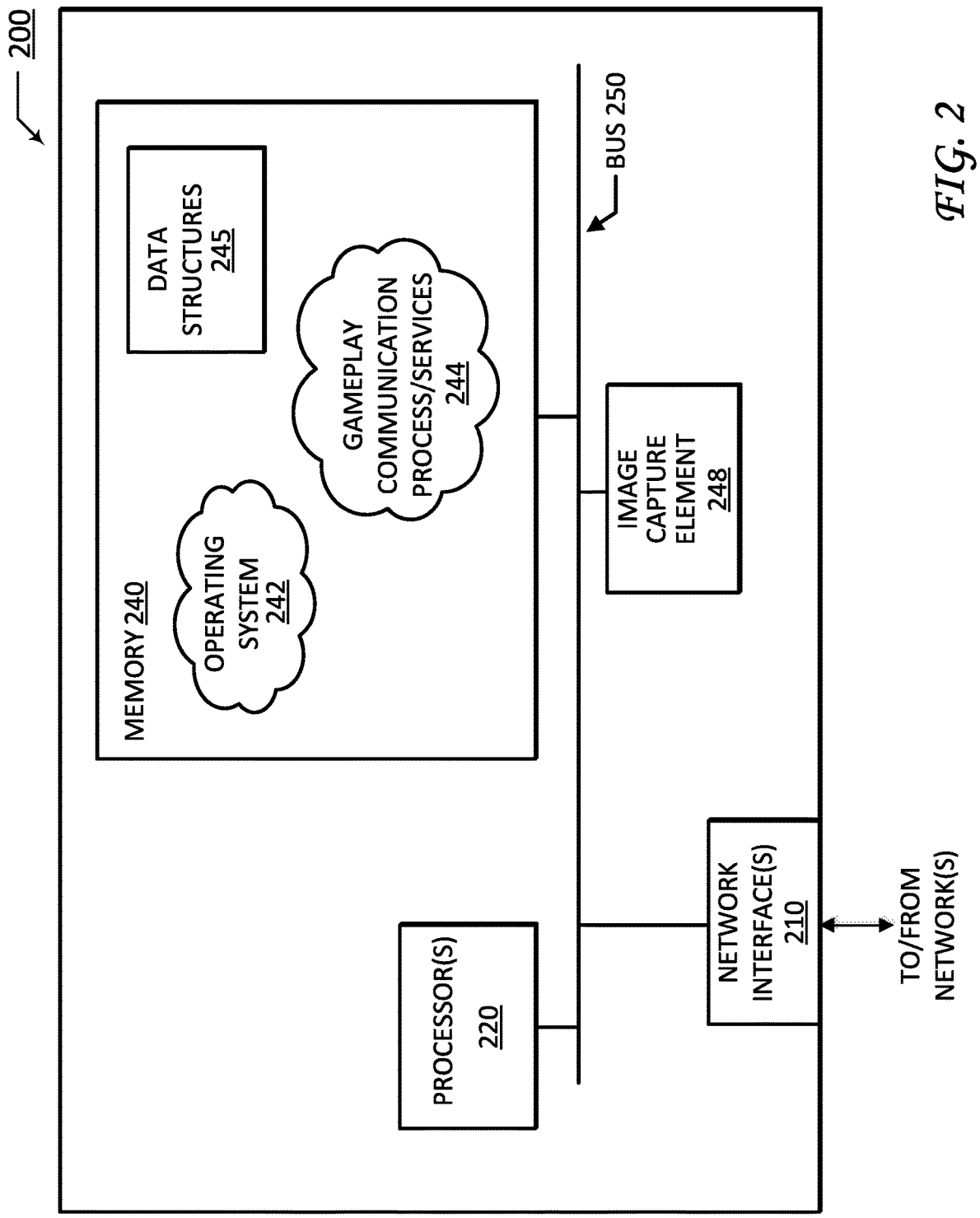
FIG. 2 illustrates a block diagram of an example controller device.

FIG. 2 illustrates a block diagram of controller 200. As shown, controller 200 includes one or more network interfaces 210 (e.g., transceivers, antennae, etc.), at least one processor 220, a memory 240, and image capture component 248 interconnected by a system bus 250.

Network interface(s) 210 contain the mechanical, electrical, and signaling circuitry for communicating data over communication links 120, shown in FIG. 1. Network interfaces 210 are configured to transmit and/or receive data using a variety of different communication protocols, as will be understood by those skilled in the art.

Memory 240 comprises a plurality of storage locations that are addressable by processor 220 and store software programs and data structures associated with the embodiments described herein. For example, memory 240 can include a tangible (non-transitory) computer-readable medium, as is appreciated by those skilled in the art.

Processor 220 represents components, elements, or logic adapted to execute the software programs and manipulate data structures 245, which are stored in memory 240. An operating system 242, portions of which are typically resident in memory 240, and is executed by processor 220 to functionally organizes the device by, inter alia, invoking operations in support of software processes and/or services executing on the device. These software processes and/or services may comprise an illustrative gameplay communication process/service 244, discussed in greater detail below. Note that while gameplay communication process/service 244 is shown in centralized memory 240, it may be configured to collectively operate in a distributed communication network of devices/nodes.

Notably, image capture component 248 is represented as a single component, however, it is appreciated that image capture component 248 may include any number of cameras, modules, components, and the like, in order to facilitate accurate facial recognition techniques discussed in greater detail below.

It will be apparent to those skilled in the art that other processor and memory types, including various computer-readable media, may be used to store and execute program instructions pertaining to the techniques described herein. Also, while the description illustrates various processes, it is expressly contemplated that various processes may be embodied as modules configured to operate in accordance with the techniques herein (e.g., according to the functionality of a similar process). Further, while the processes have been shown separately, those skilled in the art will appreciate that processes may be routines or modules within other processes. For example, processor 220 can include one or more programmable processors, e.g., microprocessors or microcontrollers, or fixed-logic processors. In the case of a programmable processor, any associated memory, e.g., memory 240, may be any type of tangible processor readable memory, e.g., random access, read-only, etc., that is encoded with or stores instructions that can implement program modules, e.g., a module having gameplay communication process 244 encoded thereon. Processor 220 can also include a fixed-logic processing device, such as an application specific integrated circuit (ASIC) or a digital signal processor that is configured with firmware comprised of instructions or logic that can cause the processor to perform the functions described herein. Thus, program modules may be encoded in one or more tangible computer readable storage media for execution, such as with fixed logic or programmable logic, e.g., software/computer instructions executed by a processor, and any processor may be a programmable processor, programmable digital logic, e.g., field programmable gate array, or an ASIC that comprises fixed digital logic, or a combination thereof. In general, any process logic may be embodied in a processor or computer readable medium that is encoded with instructions for execution by the processor that, when executed by the processor, are operable to cause the processor to perform the functions described herein.

Figure 3:
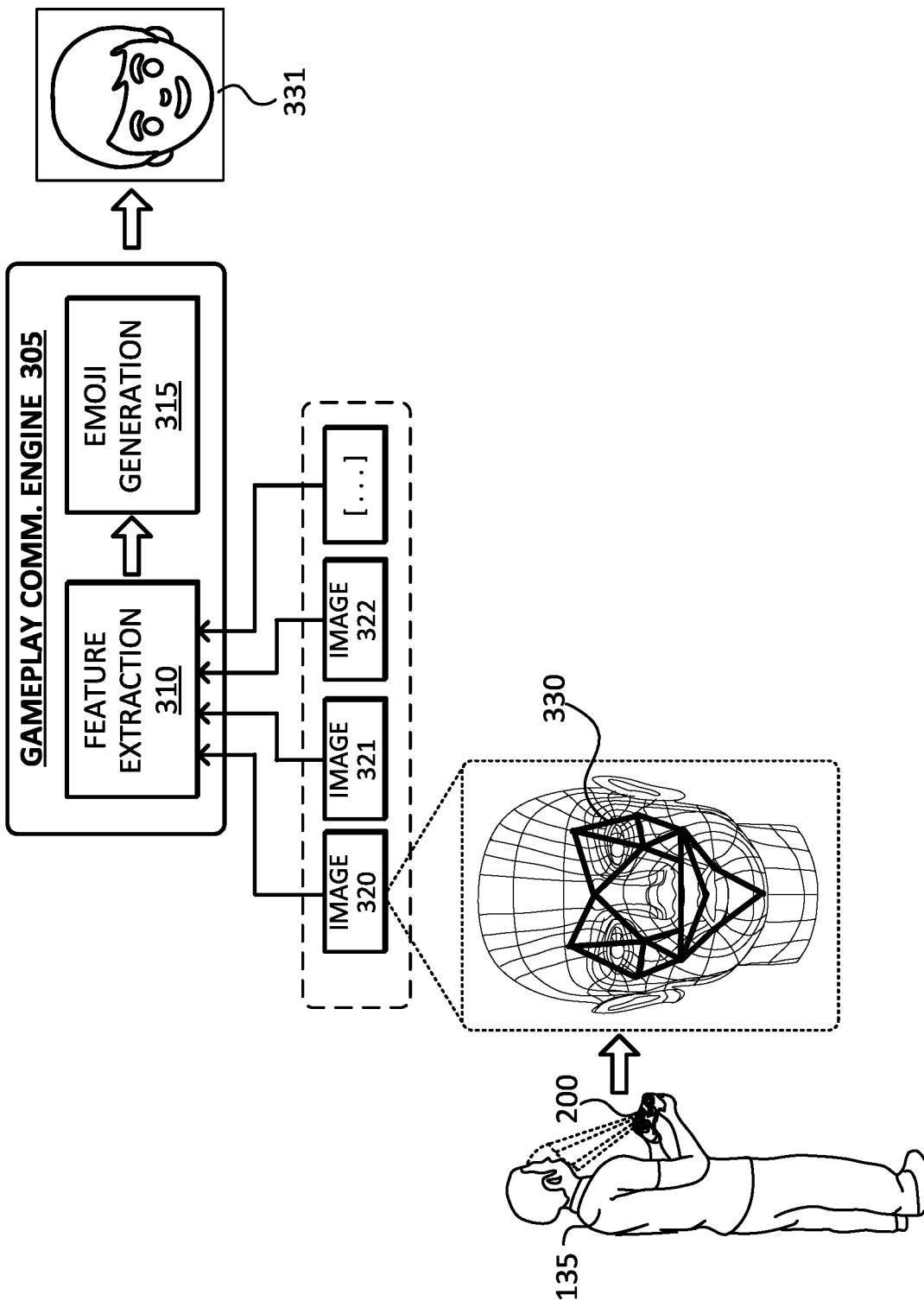
FIG. 3 illustrates a schematic diagram of a gameplay communication engine that generates an emoji based on facial features extracted from an image, according to one embodiment of this disclosure.

FIG. 3 illustrates a schematic diagram of a gameplay communication engine 305 that comprises modules for performing the above-mentioned gameplay communication process 244. Gameplay communication engine 305 represents operations of gameplay communication process 244 and is organized by a feature extraction module 310 and an emoji generation module 315. These operations and/or modules are executed or performed by processor 220 and, as mentioned, may be locally executed by controller 200, remotely executed by components of game system 130 (or other devices coupled to network 105), or combinations thereof.

In operation, controller 200 captures a frame or an image 320 of user 135 during gameplay using its integrated camera—i.e., image capture component 248 (not shown). For example, controller 200 may capture the image in response to an image capture command (e.g., a button press, a specified motion, an audio command, etc.), according to a scheduled time, and/or based on a gameplay status (e.g., a number of points achieved, a change in the number of points, gameplay milestones, etc.) In some embodiments, controller 200 captures multiple images in order to sample facial feature changes and track facial feature changes.

After image capture gameplay communication engine 305 analyzes image 320 (as well as images 321, 322, and so on) using feature extraction module 310 which extracts and determines facial features such as features 330 associated with image 320 and thus, associated with user 135. In particular, feature extraction module 310 performs facial recognition techniques on image 320 to detect specific points or landmarks present in image 320. Collectively, these landmarks convey unique and fundamental information about user 135 such as emotions, thoughts, reactions, and other information. These landmarks include for example, edges of eyes, nose, lips, chin, ears, and the like. It is appreciated that gameplay communication engine 305 may use any known facial recognition techniques (or combinations thereof) when detecting, extracting, and determining features 330 from an image.

Feature extraction module 310 subsequently passes features 330 to emoji generation module 315 to generate an emoji 331. In operation, emoji generation module 315 processes features 330 and maps these features to respective portions of a model emoji to form emoji 331. Emoji generation module 315 further adjusts or modifies such respective portions of the model emoji to reflect specific attributes of features 330 (e.g., adjust check distances, nose shape, color pallet, eyebrow contour, and the like), which results in emoji 331. In this fashion, emoji 331 may be considered a modified model emoji, as is appreciated by those skilled in the art. Notably, the model emoji may be specific to a user or it may be generic for multiple users. In either case, emoji generation module 315 creates emoji 331 based on a model or template emoji. Gameplay communication engine 305 further transmits emoji 331 for further dissemination amongst players associated with current gameplay (e.g., transmitted over an online gameplay chat channel hosted by a multi-user game platform).

Figure 4:
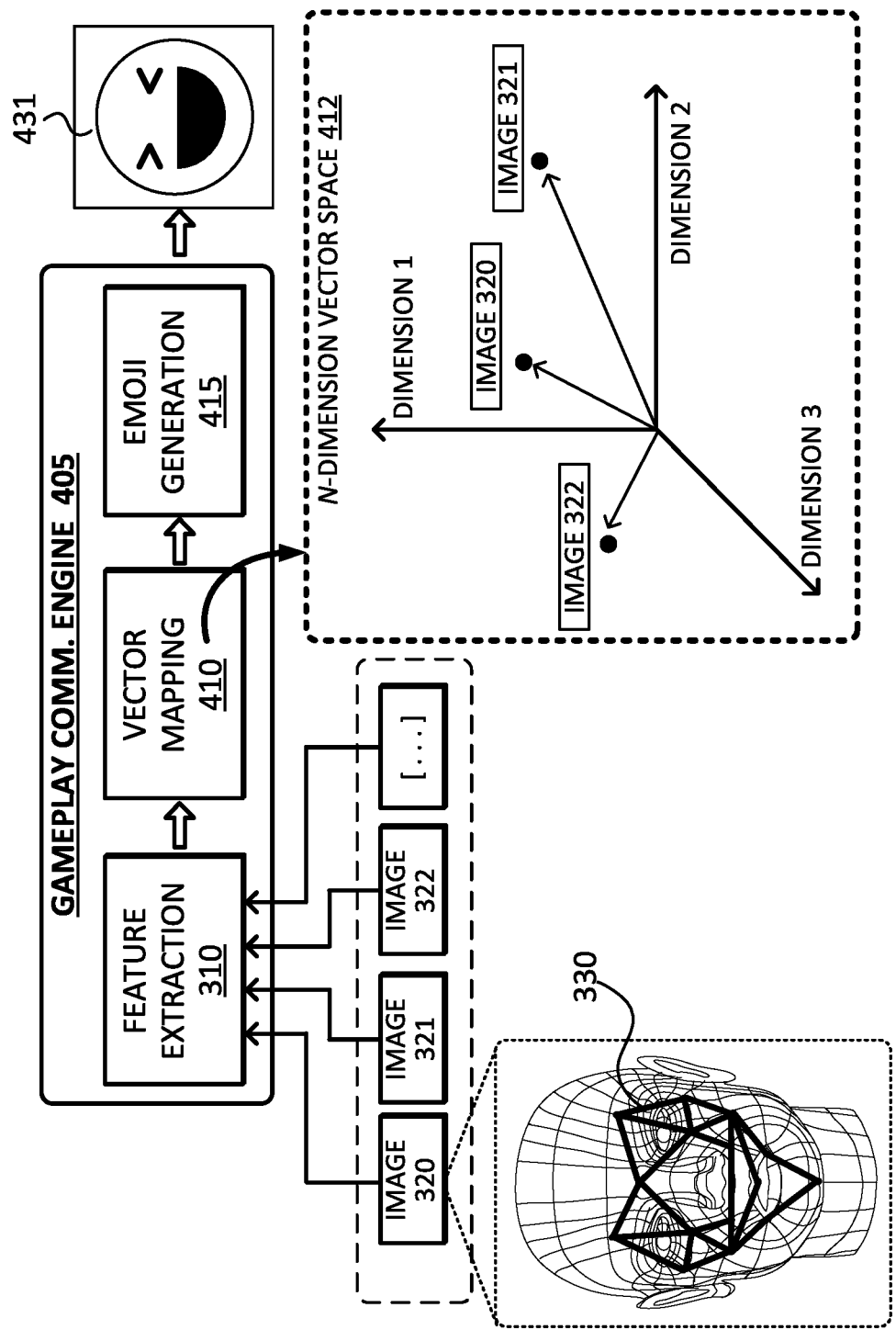
FIG. 4 illustrates a schematic diagram of another gameplay communication engine that maps facial features extracted from an image into a vector-space and generates an emoji based on the vector-space.

FIG. 4 illustrates a schematic diagram of a gameplay communication engine 405, according to another embodiment of this disclosure. Gameplay communication engine 405 includes the above-discussed feature extraction module 310 (which extracts features 330 from image 320) and additionally includes a vector mapping module 410, which maps images to a position vectors in an N-dimension vector space 412 based on respective features, and an emoji generation module 415, which generates an emoji 431 based on a proximity located position vectors, which are assigned to expressions/emotions.

More specifically, N-dimension vector-space 412 includes one or more dimensions that correspond to respective features or landmarks, where images or frames are mapped to respective position vectors according to its features. For example, dimension 1 may correspond to a lip landmark, dimension 2 may correspond to a nose landmark, dimension 3 may correspond to an ear landmark, and so on.

In operation, vector mapping module 410 maps image 320 to a position vector based on features 330 and corresponding dimensions. As discussed in greater detail below, N-dimension vector-space 412 provides a framework to map images to vector positions based on extracted features and group or assign proximately positioned vectors to specific expressions and/or emotions. For example, the vector-position associated with image 320 in N-dimension vector-space 412 may be associated with a particular expression/emotion based on its proximity to other position vectors having pre-defined associations to the expression/emotion.

Emoji generation module 415 evaluates the vector position mapped to image 320, determines the vector-position proximate to other vector positions assigned to an emotion/expression (e.g., here "happy" or "smiling") and subsequently generates emoji 431, which corresponds to the emotion/expression. Emoji 431, similar to emoji 331, is further disseminated amongst players associated with current gameplay (e.g., transmitted over an online gameplay chat channel hosted by a multi-user game platform).

Figures 5, 6:
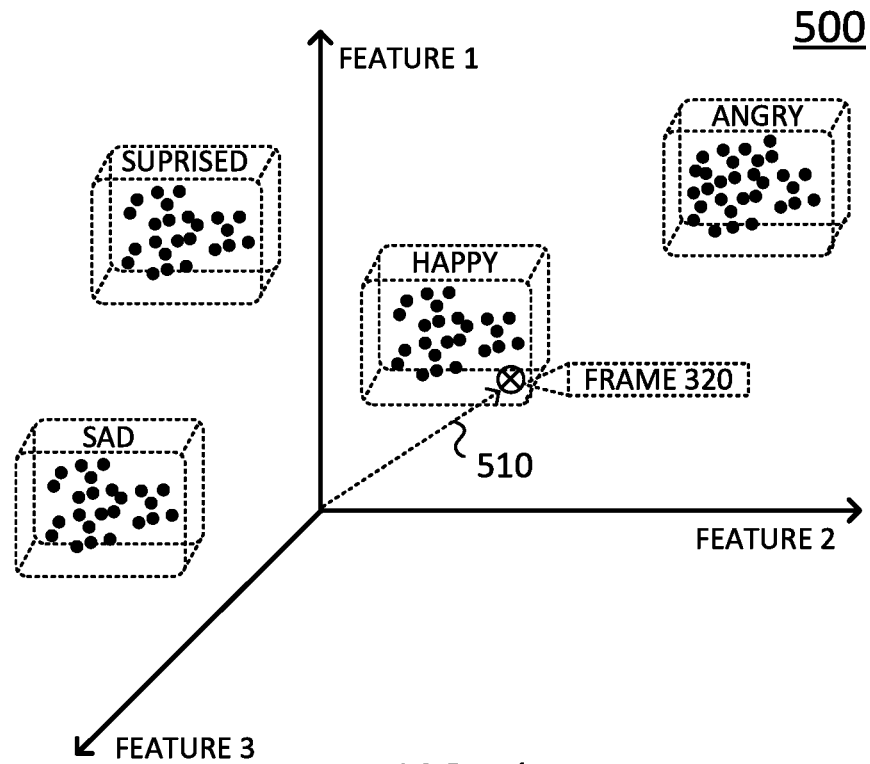
FIG. 5 illustrates a schematic diagram of a vector-space, showing position vectors organized according to respective emotions.
FIG. 6 illustrates a table that includes emoji indexed according to emotions/expressions.

FIG. 5 illustrates a vector-space 500 that includes multiple position vectors assigned or grouped according to specific emotions. As shown, groups of proximately located position vectors are grouped according to emotions such as "sad", "happy", "angry", and "surprised". It is appreciated that any number of emotions may be used, and the emotional groups shown are for purposes of discussion not limitation. Further, it is also appreciated position vectors may be organized according to particular expressions (e.g., smiling, frowning, and so on), and/or combinations of emotions and expressions.

Vector-space 500 also provides a query vector 510 that represents the position vector corresponding to image 320. As mentioned above, vector mapping module 410 generates a position vector for image 320 based on features 330 and, as shown, such position vector is formed as query vector 510. Once vector mapping module 410 generates query vector 510, emoji generation module 415 further identifies the closest or proximately located position vectors by analyzing relative distances and/or angles there-between. For example, emoji generation module 415 determines query vector 510 is proximate or positioned closest to position vectors assigned to the "happy" emotion. Thereafter, emoji generation module 415 generates an emoji corresponding to the "happy" emotion, resulting in emoji 431. For example, as discussed in greater detail below, emoji generation module 415 determines the emotion (or expression) and uses such emotion as a key to lookup emoji 431.

It is appreciated that vector-space 500 may be initially created using training data, which can be used to map vector-positions and corresponding emotions/expressions as well as to establish baseline and threshold conditions or criteria between specific emotions/expressions. Further, vector-space 500 may include more nuanced expressions/emotions and defined sub-groupings of vector-positions as desired. Moreover, vector-space 500 may be updated over time to improve accuracy for specific users (e.g., incorporating weights for certain features, etc.)

FIG. 6 illustrates a table 600 that indexes emoji according to respective emotions/expressions. As mentioned above, emoji generation module 415 determines a query vector for an image (e.g., query vector 510) is proximate to a particular emotion (e.g., "happy") and uses the particular emotion as a key to lookup the corresponding emoji (e.g., emoji 431). In this fashion, emoji generation module 415 uses table 600 to lookup a particular emoji for to a given emotion/expression and selects the particular emoji for further dissemination. While table 600 is shown with a particular set of emotions/expressions/emoji, it is appreciated any number of emotions/expressions may be used.

Figure 7:
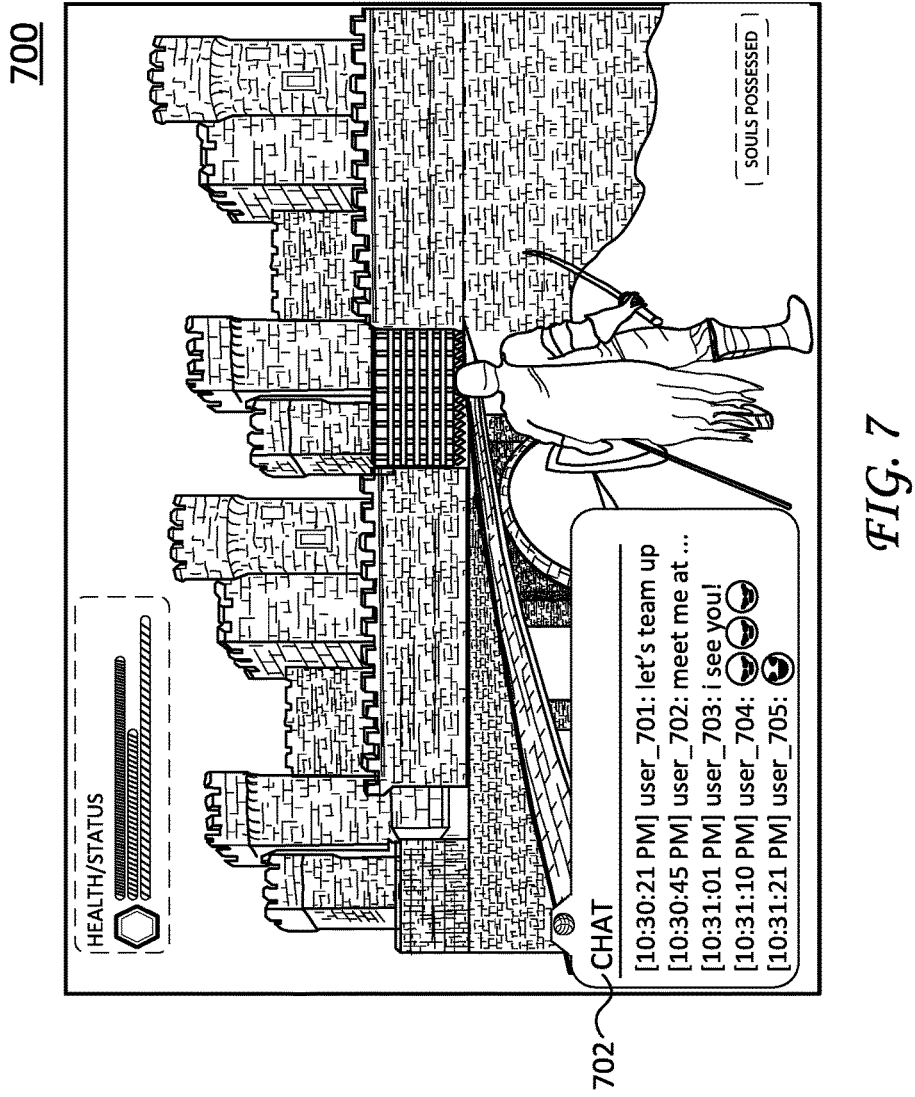
FIG. 7 illustrates a third-person perspective view of gameplay, showing a multi-user chat that supports emoji-based communications.

FIG. 7 illustrates a third-person perspective view 700 of gameplay in a game environment. Third-person perspective view 700 includes a multi-player chat 702 that supports the traditional gameplay communications (e.g., text-based communications) as well as the improved gameplay communication techniques disclosed herein. In particular, multi-player chat 702 shows text-based communications from players 701, 702, and 703 as well as emoji-based communications for players 704 and 705.

In proper context, the gameplay represented by third-person perspective view 700 is hosted by an online game platform and multi-player chat 702 represents a live in-game communication channel. As shown, during the gameplay, players 701-705 communicate with each other over multi-player chat 702. While players 701-703 communicate with text-based communications, players 704 and 705 employ the improved gameplay communication techniques to disseminate emoji. For example, player 704 operates a controller that has an integrated camera (e.g., controller 200). At some point during the gameplay, controller 200 captures an image of player 704, determines an emoji corresponding to the features extracted from the image, and transmits the emoji over multi-player chat 702.

Figure 8:
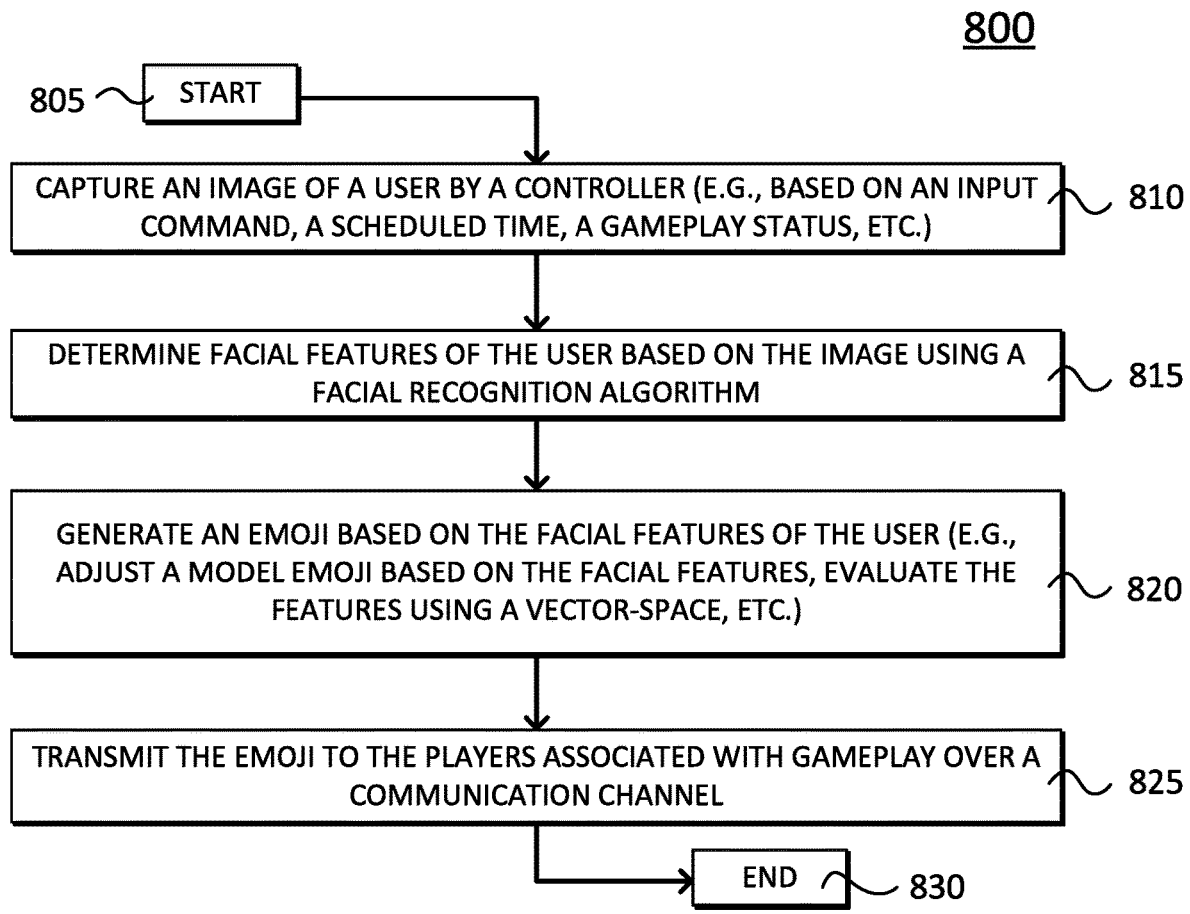
FIG. 8 illustrates an example simplified procedure for improved gameplay communications.

FIG. 8 illustrates a simplified procedure 800 for improved gameplay communications performed, for example, by a game system (e.g., game system 130) and/or a controller (e.g., controller 200) that operates in conjunction with the game system. For purposes of discussion below, procedure 800 is described with respect to the game system.

Procedure 800 begins at step 805 and continues to step 810 where, as discussed above, the game system captures an image of a user using, for example, a controller having an integrated camera. The game system can capture the image based on an image capture command, a scheduled time, and/or a gameplay status. For example, the image capture command may be triggered by a button press, an audio signal, a gesture, the like, the scheduled time may include a specific gameplay time or a per-defined time period, and the gameplay status can include a sudden change in a number of points, a total number of points, gameplay achievements, gameplay milestones, and the like.

Procedure 800 continues to step 815 where the game system determines facial features of the user based on the image using a facial recognition algorithm. As mentioned above, the game system may use any number of facial recognition techniques to identify landmarks that convey unique and fundamental information about the user. The game system further generates, in step 820, an emoji based on the facial features of the user. For example, the game system can map the facial features to respective portions of a model emoji (e.g., emoji 331) and/or it may generate the emoji based on an emotion/expression derived from a vector-space query and table lookup (e.g., emoji 431).

The game system further transmits or disseminates the emoji, in step 825, to players associated with gameplay over a communication channel. For example, the game system can transmit the emoji over a multi-player chat such as a multi-player chat 702, or any other suitable channels, as is appreciated by those skilled in the art. Procedure 800 subsequently ends at step 830, but it may continue on to step 810 where the game system captures another image of the user.

It should be noted some steps within procedure 800 may be optional, and further the steps shown in FIG. 8 are merely examples for illustration, and certain other steps may be included or excluded as desired. Further, while a particular order of the steps is shown, this ordering is merely illustrative, and any suitable arrangement of the steps may be utilized without departing from the scope of the embodiments herein.

The techniques described herein, therefore, provide improved gameplay communications that support emoji-based communications (e.g., ideograms, smileys, pictographs, emoticons, and other graphic characters/representations) for live gameplay hosted online game platforms. In particular, these techniques generate emoji based on feature extracted from images of a user, which images are captured by a controller having an integrated camera. While there have been shown and described illustrative embodiments for improved gameplay communications content and operations performed by specific systems, devices, components, and modules, it is to be understood that various other adaptations and modifications may be made within the spirit and scope of the embodiments herein. For example, the embodiments have been shown and described herein with relation to controllers, game systems, and platforms. However, the embodiments in their broader sense are not as limited, and may, in fact, such operations and similar functionality may be performed by any combination of the devices shown and described.

The foregoing description has been directed to specific embodiments. It will be apparent, however, that other variations and modifications may be made to the described embodiments, with the attainment of some or all of their advantages. For instance, it is expressly contemplated that the components and/or elements described herein can be implemented as software being stored on a tangible (non-transitory) computer-readable medium, devices, and memories such as disks, CDs, RAM, and EEPROM having program instructions executing on a computer, hardware, firmware, or a combination thereof.

Further, methods describing the various functions and techniques described herein can be implemented using computer-executable instructions that are stored or otherwise available from computer readable media. Such instructions can comprise, for example, instructions and data which cause or otherwise configure a general purpose computer, special purpose computer, or special purpose processing device to perform a certain function or group of functions. Portions of computer resources used can be accessible over a network. The computer executable instructions may be, for example, binaries, intermediate format instructions such as assembly language, firmware, or source code.

Examples of computer-readable media that may be used to store instructions, information used, and/or information created during methods according to described examples include magnetic or optical disks, flash memory, USB devices provided with non-volatile memory, networked storage devices, and so on. In addition, devices implementing methods according to these disclosures can comprise hardware, firmware and/or software, and can take any of a variety of form factors. Typical examples of such form factors include laptops, smart phones, small form factor personal computers, personal digital assistants, and so on.

Functionality described herein also can be embodied in peripherals or add-in cards. Such functionality can also be implemented on a circuit board among different chips or different processes executing in a single device, by way of further example. Instructions, media for conveying such instructions, computing resources for executing them, and other structures for supporting such computing resources are means for providing the functions described in these disclosures.

Accordingly this description is to be taken only by way of example and not to otherwise limit the scope of the embodiments herein. Therefore, it is the object of the appended claims to cover all such variations and modifications as come within the true spirit and scope of the embodiments herein.

What is claimed is:

1. A method for emoji-based communications derived from facial features, the method comprising:
    establishing a vector-space based on a plurality of facial expressions, each facial expression associated with a group of position vectors mapped based on facial features that each correspond to a dimension in the vector-space, and wherein establishing the vector-space includes establishing threshold conditions between different facial expressions;
    storing a plurality of emojis in a lookup table in memory, each emoji corresponding to a different one of the facial expressions;
    capturing an image of a user with a camera during gameplay, the image captured when a gameplay status meets a predetermined gameplay milestone;
    extracting facial features of the user from the image as captured when the gameplay status met the predetermined gameplay milestone;
    identifying a facial expression associated with the extracted facial features by comparing a query vector that maps the extracted facial features to a plurality of position vectors associated with the different facial expressions, wherein the facial expression is identified based on proximity of a mapped position vector to the query vector and the threshold conditions;
    identifying one of the stored emojis in the lookup table as corresponding to the identified facial expression;
    modifying the identified emoji based on the extracted facial features of the user; and
    transmitting the emoji to at least one peer of the user over a communication channel, the at least one peer associated with the gameplay when the gameplay status met the predetermined gameplay milestone.

2. The method of claim 1, wherein capturing another image of the user is based on one or more of an image capture command or a scheduled time.

3. The method of claim 1, wherein the captured image is among multiple images captured of the user, and further comprising:
    determining a change in the facial features of the user based on the multiple images; and
    selecting one of the multiple images based on the determined change, wherein the facial features are extracted from the selected image.

4. The method of claim 1, wherein extracting the facial features of the user further comprises determining landmarks in the image based on a facial recognition algorithm.

5. The method of claim 1, wherein the identified emoji is a model emoji, and wherein modifying the identified emoji further comprises adjusting portions of the model emoji based on the extracted facial features to form a modified model emoji.

6. The method of claim 1, wherein identifying the emoji corresponding to the identified facial expression further comprises comparing the extracted facial features to one or more facial features mapped to the stored plurality of emoji.

7. The method of claim 1, wherein identifying the emoji corresponding to the identified facial expression further comprises determining an emotion associated with the extracted facial features, wherein the identified emoji corresponds to the determined emotion.

8. The method of claim 1, further comprising:
    mapping a plurality of images to a plurality of position vectors in the vector-space based on the facial features extracted from each image; and
    assigning one or more position vectors to a group that represents a same emotion based on proximity in the vector-space.

9. The method of claim 8, wherein the vector-space includes a plurality of groups that each correspond to a different emotion.

10. The method of claim 1, wherein the transmitted emoji includes one or more of an ideogram, a smiley, a pictograph, or an emoticon.

11. The method of claim 1, further comprising generating a model emoji specific to the user based on the extracted features.

12. The method of claim 11, wherein generating the model emoji further comprises mapping one or more of the extracted features to a corresponding portion of the model emoji.

13. A system for emoji-based communications derived from facial features, the system comprising:
    memory that stores:

a vector-space established based on a plurality of facial expressions, each facial expression associated with a group of position vectors mapped based on facial features that each correspond to a dimension in the vector-space, and wherein the vector-space includes threshold conditions between different facial expressions, and a plurality of emojis in a lookup table, each emoji corresponding to a different one of the facial expressions;

a camera that captures an image of a user during gameplay, the image captured when a gameplay status meets a predetermined gameplay milestone;

a processor that executes instructions stored in the memory, wherein execution of the instructions by the processor:

extracts facial features of the user from the image as captured when the gameplay status met the predetermined gameplay milestone;

identifies a facial expression associated with the extracted facial features by comparing a query vector that maps the extracted facial features to a plurality of position vectors associated with the different facial expressions, wherein the identified facial expression has is identified based on proximity of a mapped position vector to the query vector and the threshold conditions;

identifies one of the stored emojis in the lookup table as corresponding to the identified facial expression; and modifies the identified emoji based on the extracted facial features of the user; and a network interface that communicates over a communication channel, wherein the network interface transmits the emoji to at least one peer of the user over the communication channel, the at least one peer associated with the gameplay when the gameplay status met the predetermined gameplay milestone.

14. The system of claim 13, wherein the camera captures another image based on one or more of an image capture command or a scheduled time.

15. The system of claim 13, wherein the captured image is among multiple images captured of the user, and wherein the processor executes further instructions to:

determine a change in the facial features of the user from the multiple images; and select one of the multiple images as the selected image based on the determined change, wherein the facial features are extracted from the selected image.

16. The system of claim 13, wherein the processor extracts the facial features of the user by determining landmarks in the image based on a facial recognition algorithm.

17. The system of claim 13, wherein the identified emoji is a model emoji, wherein the processor modifies the identified emoji by adjusting portions of the model emoji based on the extracted facial features to form a modified model emoji.

18. The system of claim 13, wherein the processor identifies the emoji corresponding to the identified facial expression by comparing the extracted facial features to one or more facial features mapped to the stored plurality of emoji.

19. The system of claim 13, wherein the processor identifies the emoji corresponding to the identified facial expression by determining an emotion associated with the extracted facial features, wherein the identified emoji corresponds to the determined emotion.

20. A tangible, non-transitory, computer-readable storage medium, having instructions encoded thereon, the instructions executable by a processor to perform a method for emoji-based communication, the method comprising:

establishing a vector-space based on a plurality of facial expressions, each facial expression associated with a group of position vectors mapped based on facial features that each correspond to a dimension in the vector-space, and wherein establishing the vector-space includes establishing threshold conditions between different facial expressions;

storing a plurality of emojis in a lookup table in memory, each emoji corresponding to a different one of the facial expressions;

capturing an image of a user with a camera during gameplay, the image captured when a gameplay status meets a predetermined gameplay milestone;

extracting facial features of the user from the captured image as captured when the gameplay status met the predetermined gameplay milestone;

identifying a facial expression associated with the extracted facial features by comparing a query vector that maps the extracted facial features to a plurality of position vectors associated with the different facial expressions, wherein the facial expression is identified based on proximity of a mapped position vector to the query vector and the threshold conditions;

identifying one of the stored emojis in the lookup table as corresponding to the identified facial expression;

modifying the identified emoji based on the extracted facial features of the user; and transmitting the emoji to at least one peer of the user over a communication channel, the at least one peer associated with the gameplay when the gameplay status met the predetermined gameplay milestone.

* * * * *